(12) United States Patent
Suwa

(10) Patent No.: US 8,599,276 B2
(45) Date of Patent: Dec. 3, 2013

(54) IMAGE CAPTURE APPARATUS AND CONTROL METHOD FOR THE IMAGE CAPTURE APPARATUS

(75) Inventor: Takeshi Suwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/348,936

(22) Filed: Jan. 12, 2012

(65) Prior Publication Data

US 2012/0182444 A1    Jul. 19, 2012

(30) Foreign Application Priority Data

Jan. 14, 2011 (JP) ................ 2011-006124

(51) Int. Cl.
*H04N 5/228* (2006.01)
(52) U.S. Cl.
USPC .................... 348/218.1; 348/222.1
(58) Field of Classification Search
USPC .......... 348/216.1, 218.1, 222.1, 239
See application file for complete search history.

(56) References Cited

U.S. PATENT DOCUMENTS

2005/0052551 A1* 3/2005 Tsunoda ............. 348/231.6
2012/0133797 A1* 5/2012 Sato et al. ............. 348/239

FOREIGN PATENT DOCUMENTS

JP    2005-086228 A    3/2005

* cited by examiner

*Primary Examiner* — Timothy J Henn
(74) *Attorney, Agent, or Firm* — Canon USA Inc. IP Division

(57) ABSTRACT

An image capture apparatus compares a first pixel value and a second pixel value at the same address of two images captured by continuous shooting with a predetermined threshold, and, when at least one of the first pixel value and the second pixel value exceeds the predetermined threshold, updates the second pixel value with a not smaller one of the first pixel value and the second pixel value. After repeating updating of the image data for a plurality of image planes, the image capture apparatus generates a combined image data using the image data in a memory.

20 Claims, 11 Drawing Sheets

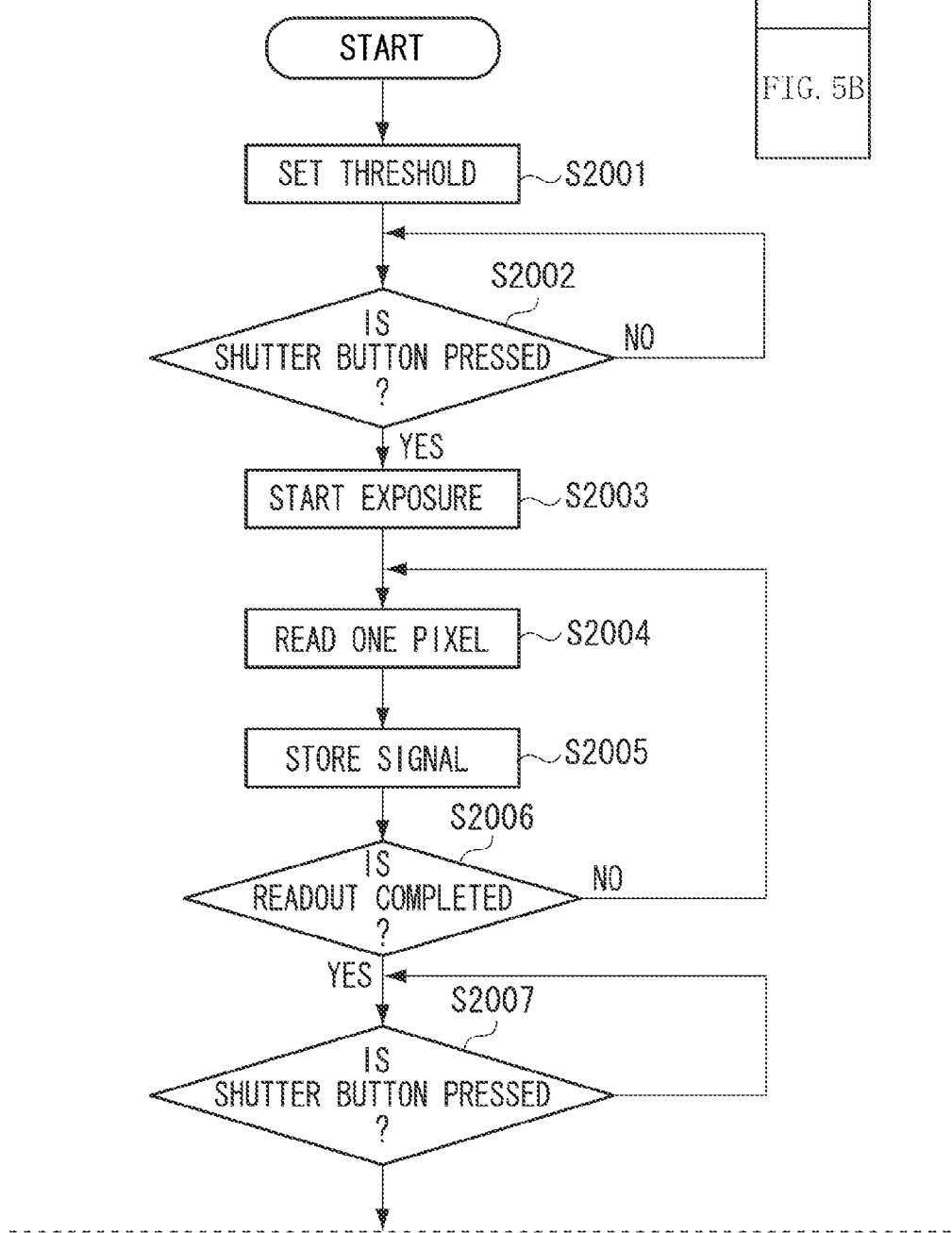

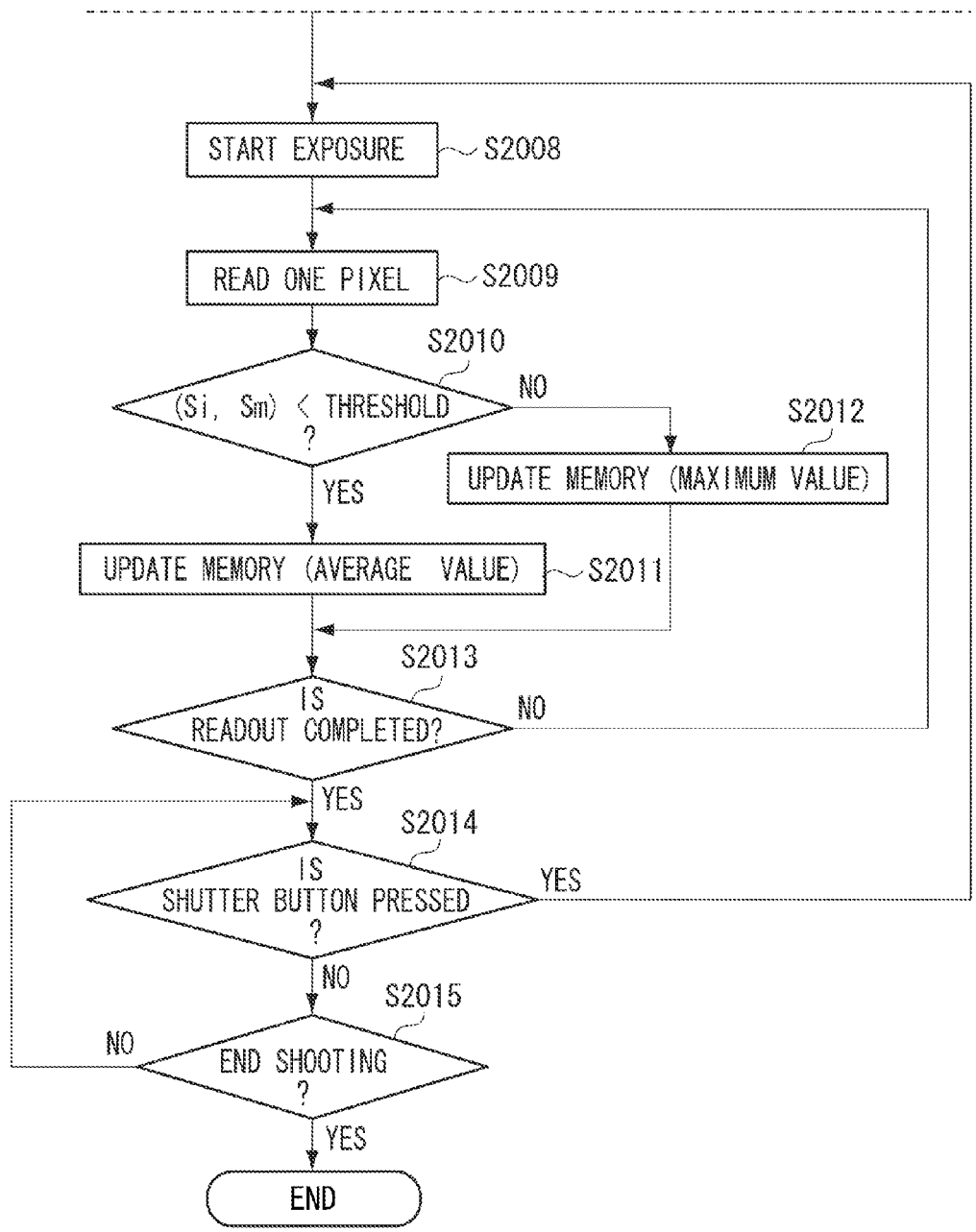

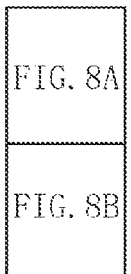
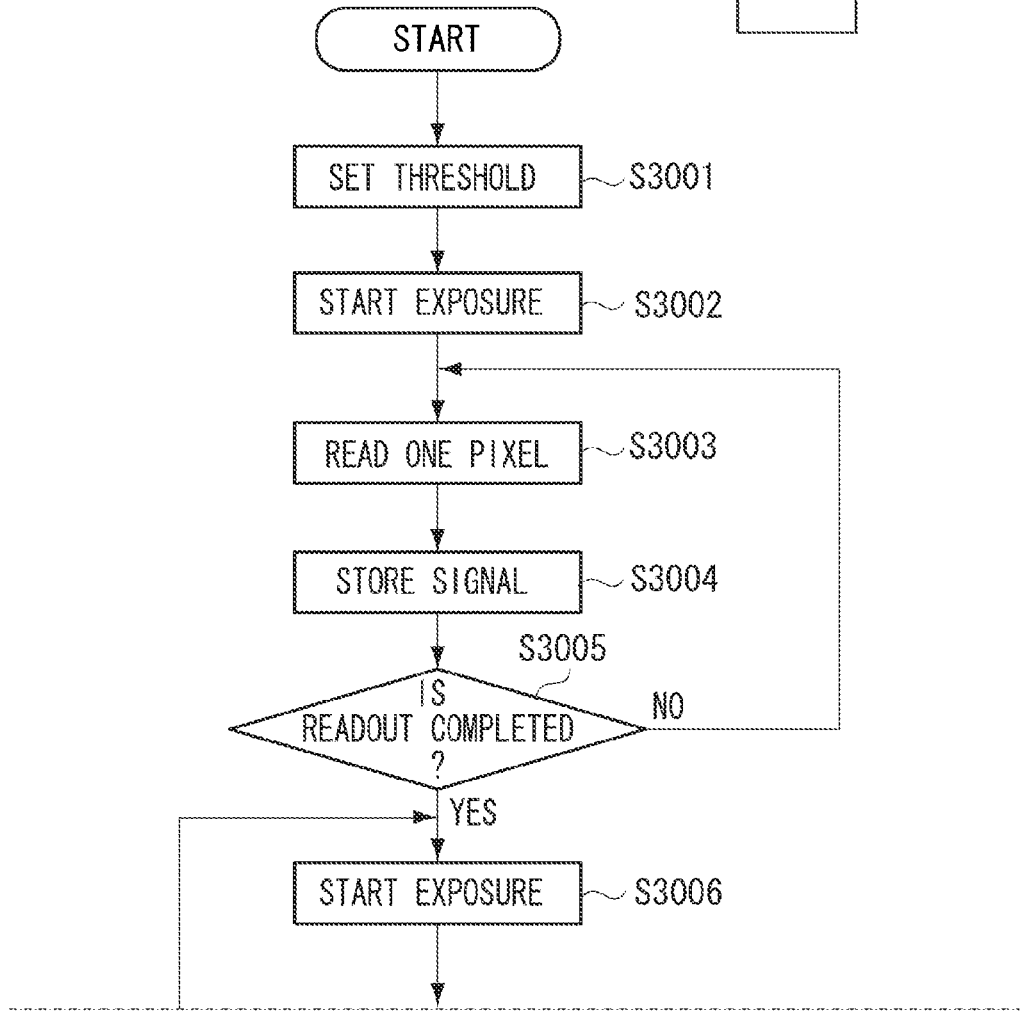
FIG. 8A

IMAGE CAPTURE APPARATUS AND CONTROL METHOD FOR THE IMAGE CAPTURE APPARATUS

BACKGROUND OF THE INVENTION

1. Field of the Invention

The present invention relates to an image capture apparatus and a control method for the image capture apparatus.

2. Description of the Related Art

To capture an image of a light trajectory like fireworks, conventionally, a method for generating a combined image using a plurality of images captured by shooting under manually-adjusted exposure in which a shutter time is set relatively long or by continuous shooting is available.

Japanese Patent Application Laid-Open No. 2005-086228 discusses a combination method in which a predetermined number of frames of images captured by shooting an object at a predetermined time interval are retained in order of time series and combined together by specifying a combination range from viewpoints of time series.

However, the method discussed in Japanese Patent Application Laid-Open No. 2005-086228 has such a problem that its required operation for acquiring a desired combined image is troublesome.

SUMMARY OF THE INVENTION

The present invention is directed to an image capture apparatus capable of generating a desired combined image using a plurality of images captured by continuous shooting with a simple operation, and to a method for the image capture apparatus.

According to an aspect of the present invention, an image capture apparatus includes an imaging unit configured to capture an image of an object to output image data, a memory having a capacity capable of storing image data for one image plane output from the imaging unit, a comparison unit configured to compare both a first pixel value of first image data output from the imaging unit and a second pixel value, corresponding to the first pixel value of the first image data, of second image data for one image plane stored in the memory with a predetermined threshold, an updating unit configured to, when at least one of the first pixel value and the second pixel value exceeds the predetermined threshold in comparison by the comparison unit, update the second pixel value with a not smaller one of the first pixel value and the second pixel value, and a control unit configured to generate, using image data stored in the memory after causing the comparison unit and the updating unit to repeat the comparison and the updating of image data for a plurality of image planes, combined image data from the image data for a plurality of image planes.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5, which is composed of FIGS. 5A and 5B, is a flow chart illustrating a driving method for an image capture apparatus according to a second exemplary embodiment of the present invention.

DESCRIPTION OF THE EMBODIMENTS

Various exemplary embodiments, features, and aspects of the invention will be described in detail below with reference to the drawings.

Figure 1:
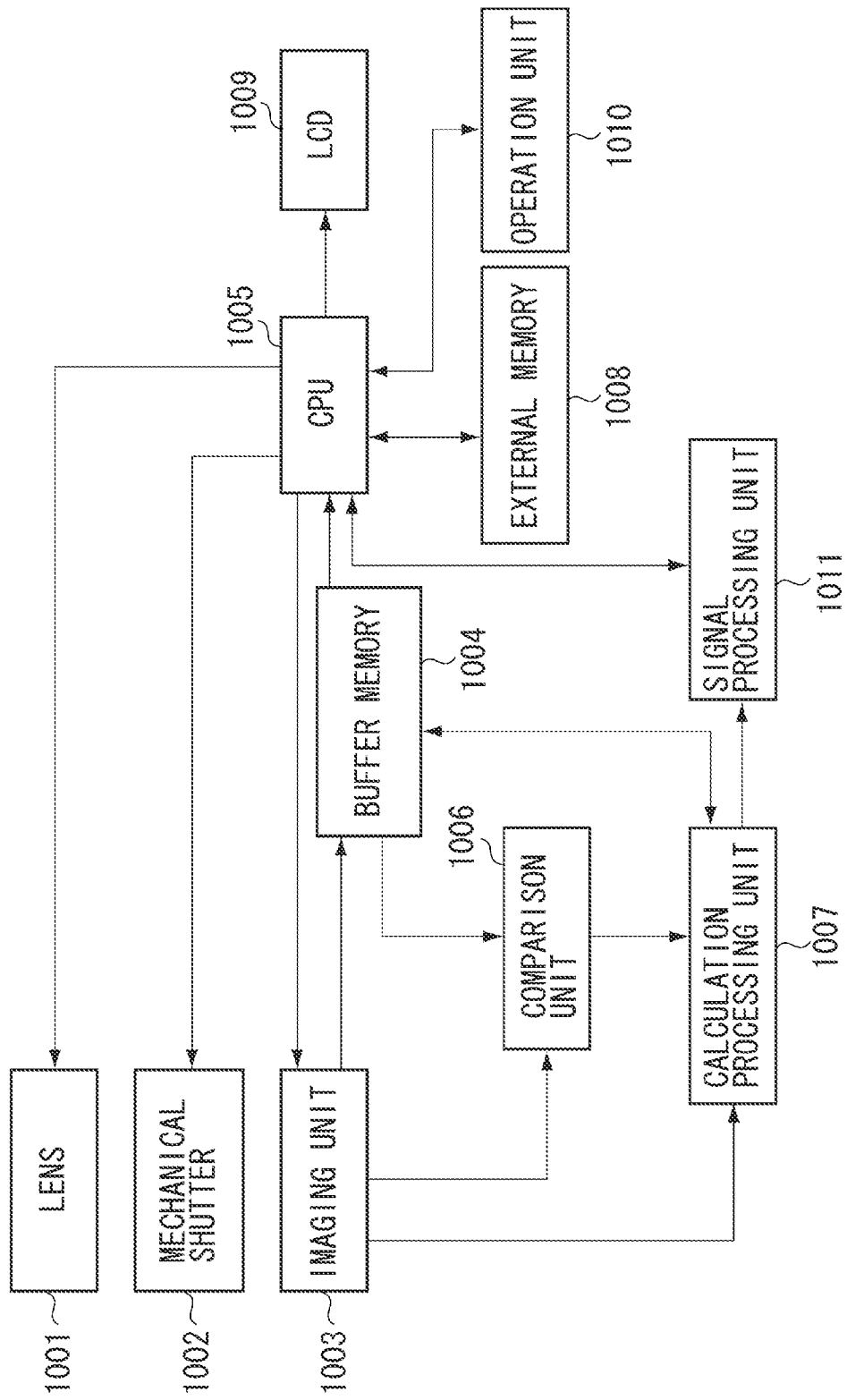
FIG. 1 is a block diagram illustrating the configuration of an image capture apparatus according to a first exemplary embodiment of the present invention.

FIG. 1 is a block diagram illustrating the configuration of an image capture apparatus according to a first exemplary embodiment of the present invention. The image capture apparatus according to the present exemplary embodiment switches between selective storage of a signal value larger than a threshold and storage of an averaged signal value of a low luminance portion, depending on the signal value.

The configuration of the image capture apparatus according to the present exemplary embodiment will be described with reference to FIG. 1. A lens 1001 for forming an image of an object includes a diaphragm configured to adjust the amount of light. A mechanical shutter 1002 is disposed on a light path of the lens 1001.

An imaging unit 1003 captures an object image formed by the lens 1001 and converts the image to electric information. According to the present exemplary embodiment, a complementary metal-oxide semiconductor (CMOS) image sensor or a charge-coupled device (CCD) image sensor is used as an image sensor included in the imaging unit 1003. The imaging unit 1003 includes a correlated double sampling (CDS) circuit and an auto gain control (AGC) circuit as well as the image sensor. An output of the imaging unit 1003 is sent to a comparison unit 1006 and a buffer memory 1004.

A buffer memory 1004 is capable of temporarily storing information from the imaging unit 1003 and has a capacity enough for storing information for at least one image plane from the imaging unit 1003.

A central processing unit (CPU) 1005 configured to control the image capture apparatus controls a display unit 1009 and an external memory 1008 as well as the lens 1001, the mechanical shutter 1002 and the imaging unit 1003.

The comparison unit 1006 compares a signal output from the imaging unit 1003 with a signal stored on the buffer memory 1004.

A calculation processing unit 1007 makes a calculation based on a comparison result of the comparison unit 1006, an output signal value from the imaging unit 1003, and a signal value stored on the buffer memory 1004. The external memory 1008 stores an image generated by processing a signal stored in the buffer memory 1004 by the CPU 1005.

The display unit 1009 displays a variety of information about the image capture apparatus, such as a shooting condition and through-the-lens images.

An operation unit 1010 includes a shutter button serving as a trigger for shooting, a shooting interruption button for interrupting the shooting, and a shooting condition setting button. When one of those buttons is pressed, a variety of operations can be executed based on a determination by the CPU 1005.

The shape of the operation unit 1010 is not limited to a button as long as the operation intended by a user is enabled, and it may be a ring or a surface pressure sensor.

A signal processing unit 1011 executes development processing, such as white balance processing and color space conversion processing, on an image signal output from the calculation processing unit 1007.

Ordinary members and processing blocks provided on the image capture apparatus will not be described because they are not directly related to the present exemplary embodiment.

Figure 2:
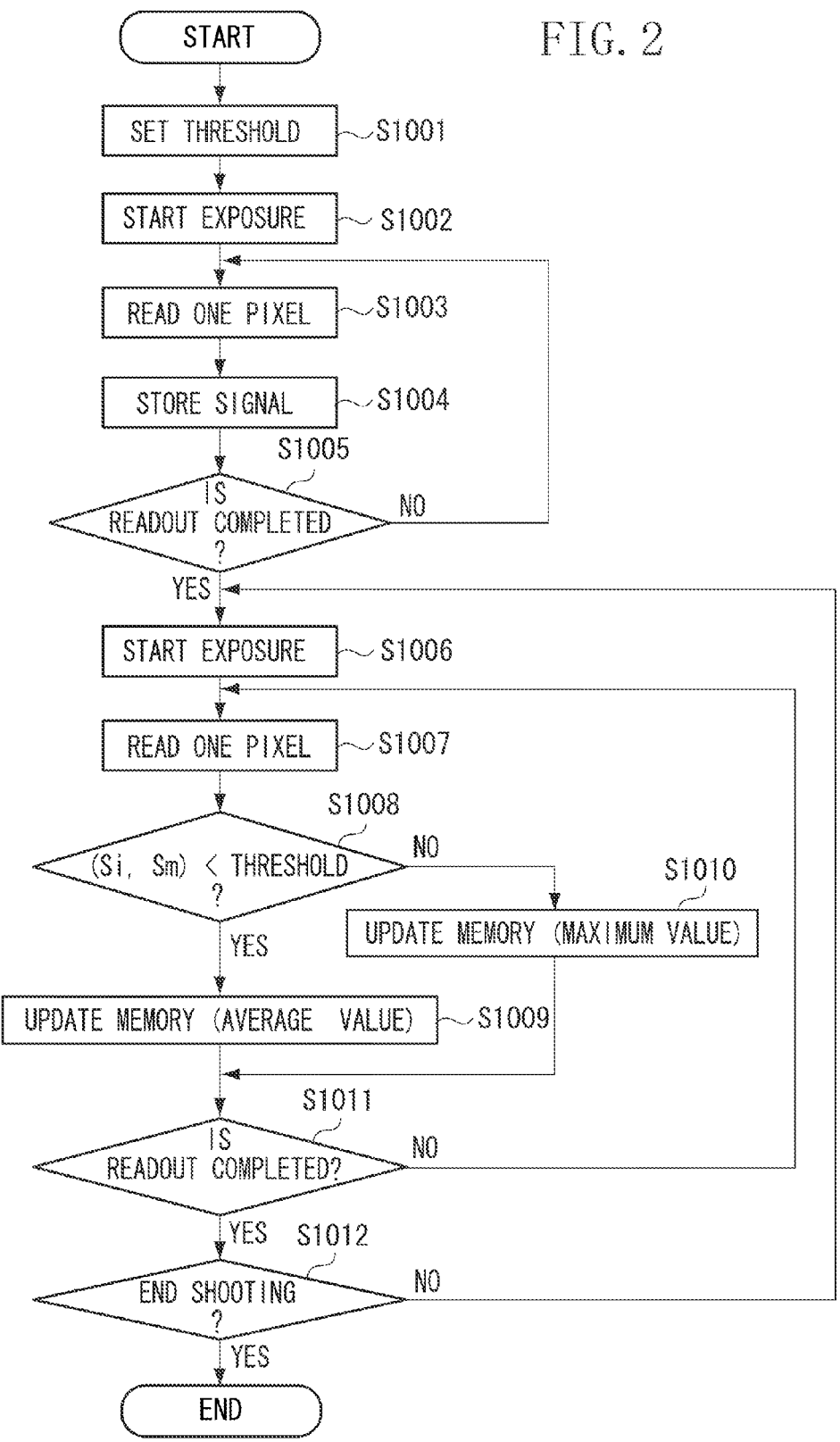
FIG. 2 is a flow chart illustrating a driving method for the image capture apparatus according to the first exemplary embodiment.

Next, an operation of the image capture apparatus according to the present exemplary embodiment will be described with reference to FIG. 2. FIG. 2 is a flow chart illustrating an image capture operation of the image capture apparatus according to the present exemplary embodiment. Each processing is executed at each unit by the CPU 1005 or according to an instruction from the CPU 1005.

First, in step S1001, thresholds KR, KG, and KB are set. These thresholds are set for respective color filters of the image sensor.

The reason is that an image sensor in which red (R), green (G), and blue (B) color filters, which are used frequently in the image capture apparatus, are arranged in the Bayer array, suffers a difference in sensitivity to a white object depending on the color filters.

Further, the sensitivity ratio of the aforementioned color filters changes depending on the kind of a light source, such as solar light or fluorescent.

In views of the above, the thresholds KR, KG, and KB of the color filters for R pixel, G pixel, and B pixel respectively can be calculated with respect to a luminance value Y, as expressed in the following equations:

$$KB=(Y+1.40200 \times Cr)/WBr$$

$$KG=(Y-0.34414 \times Cb-0.71414 \times Cr)/WBg$$

$$KB=(Y+1.77200 \times Cb)/WBb \quad (1)$$

where Cb and Cr indicate color difference signals.

Once the luminance value Y serving as the threshold is determined as described above, the thresholds KR, KG, and KB of the color filters are automatically determined according to equations (1).

The equation for conversion from the signal value of each color filter is expressed in the following equations.

$$Y=0.29891 \times SR+0.58661 \times SG+0.11448 \times SB$$

$$Cb=-0.16874 \times SR-0.33126 \times SG+0.50000 \times SB$$

$$Cr=0.50000 \times SR-0.41869 \times SG-0.08131 \times SB \quad (2)$$

were SR indicates a signal value of the R pixel, SG indicates a signal value of the G pixel, and SB indicates a signal value of the B pixel.

WBr indicates a white balance coefficient of the R pixel, WBg indicates a white balance coefficient of the G pixel and WBb indicates a white balance coefficient of the B pixel. These white balance coefficients are used for white balance processing by the signal processing unit (white balance processing unit) 1011.

Although the details of the luminance value and the white balance coefficients are not described here because they are generally known, with the white balance coefficients already determined, specifying only the luminance value as described above enables the threshold of the pixel signal value of each of the RGB color filters to be specified easily.

Alternatively, the white balance coefficients may be determined according to a program prepared in the image capture apparatus using a result of a preliminary image capture operation (preliminary exposure) prior to a regular image capture operation for a combined image.

The luminance value Y serving as the threshold may be stored in the image capture apparatus as a predetermined value or may be determined arbitrarily for a user to generate the desired image.

Next, in step S1002, an exposure operation is started according to an exposure condition specified prior to start of the shooting. Assume that the exposure condition is predetermined by a user or according to a program stored in the image capture apparatus. Further, assume that the exposure conditions for a plurality of images are identical. The reason for this is due to an assumption that according to the first exemplary embodiment, a plurality of exposures are executed on an identical object whose shape may change with time.

An introduction method for the exposure condition is not described here because it is not directly related to signal processing particular to the present exemplary embodiment. As the aforementioned exposure condition, exposure time, aperture value, and ISO sensitivity (corresponding to a signal gain of an output from the imaging unit 1003) may be mentioned.

According to the first exemplary embodiment, the exposure time is substantially equal to a readout time for one image plane, namely, the frame rate. The purpose for this is to capture the trajectory of a bright line changing with time continuously not to be interrupted on a combined image by making a non-exposure time as short as possible upon shooting for a plurality of images.

If the exposure amount is over an appropriate level, the diaphragm may be narrowed to control the amount of incident light on the image sensor in the imaging unit 1003, or the frame rate of the image plane is adjusted to be substantially equal to the exposure time by decreasing the signal gain in an AGC circuit of the imaging unit 1003.

When the signal gain of the AGC circuit in the imaging unit 1003 is increased, the signal-to-noise (SN) ratio deteriorates. Thus, if the exposure amount cannot be adjusted with the diaphragm, e.g., a case where the light amount is short even when the diaphragm is opened fully or a case where the diaphragm needs to be kept narrow in order to secure a large depth of field, the gain may be increased.

In step S1003, after the exposure, a signal of each pixel is readout from the image sensor, and in step S1004, stored in the buffer memory 1004.

In step S1005, the above-described signal readout is repeated until the readout of all the pixels ends. Upon the readout, an appropriate gain is given to an output signal from the imaging unit 1003 by the AGC circuit in the imaging unit 1003. The aforementioned processing is necessary for increasing signals to agree with a preliminarily set ISO sensitivity.

Next, in step S1006, a second exposure is started. As described above, the exposure condition for the second time and on is equal to the exposure condition for the first time.

In step S1007, after the second exposure is completed, a signal for one pixel is read out. Likewise, upon the readout, an appropriate gain is given to the signal in order to secure a desired ISO sensitivity.

Assume that a signal value of a pixel in image data (first image data) read out form the imaging unit 1003 is Si (first pixel value) and that a signal value of a pixel in the image data (second image data) stored in the buffer memory 1004, corresponding to the pixel of the signal value Si, is Sm (second pixel value). The pixel "corresponding to" the pixel of the signal value Si refers to a pixel corresponding to an object being shot. In the present exemplary embodiment, in which no positioning processing for images is carried out, the "corresponding" pixels refer to pixels located at the same address. When generating a combined image by combining images after the positioning processing is made by calculating an amount of deviation between the two images based on a difference between the two images, the "corresponding" pixels refer to pixels regarded to be at the same address after the positioning. In step S1008, the comparison unit 1006 determines, by comparison, whether both the signal values Si and Sm are smaller than each of the predetermined thresholds KR, KG, and KB of the color filters.

If both the signal values Si and Sm are smaller (YES in step S1008), then in step S1009, the calculation processing unit 1007 performs averaging processing on the signal read out from the imaging unit 1003 and the signal value at the same address stored in the buffer memory 1004 and overwrites its result as a signal value at the same address.

As the averaging processing, weighted averaging processing may be carried out to equalize the weight of the image data of a plurality of images to be shot.

More specifically, the signal value obtained by the averaging processing made by readout of an n-th image following the first one is expressed as follows:

$$Sm'=(1/n)\times Si+((n-1)/n)\times Sm$$

A result Sm' of the aforementioned weighted averaging processing is written at the same address on the buffer memory 1004.

Unless, in step S1008, at least one of the signal values Si and Sm is smaller than the threshold (NO in step S1008), then in step S1010, the calculation processing unit 1007 writes a not smaller one of the signal values Si and Sm at the same address on the buffer memory 1004.

According to the first exemplary embodiment, as described above, selective storage of a signal value larger than the threshold and storage of an averaged signal value of the low luminance portion are switched over depending on a signal value.

The reason why the processing is changed depending on the signal value as described above is that rising of a signal due to random noise can be suppressed compared to a case of storing large signal values for all the pixels.

In step S1011, the aforementioned processing is repeated until the readout of the signal values for one image plane is completed. In step S1012, after the readout of the signal values for one image plane is completed, whether shooting should be ended is determined. If a user's instruction of ending the shooting is issued, image data generated in the memory at that time is output as final combined image data, and then, the processing for acquiring the combined image ends.

Determining whether the shooting should be ended may be made depending on whether an instruction by the user for ending the shooting is input via the operation unit 1010.

The instruction by the user for ending the shooting may be defined to be a period until the user releases a shooting start button after it is pressed, like ordinarily known bulb shooting, or a shooting end button may be allocated to the operation unit 1010 as a function. Additionally, the number of images to be captured may be preliminarily specified by the user.

The user may determine a shooting period in real time by the above-described operation. The CPU 1005 may read out a signal value recorded in the buffer memory 1004 each time the signal value for one image plane is updated and determine whether an average luminance value of the image exceeds a predetermined value. If the average luminance value exceeds the predetermined value, the shooting may be ended to output a combined image.

Further, the user may be allowed to specify the number of images to be captured and a shooting time via the operation unit 1010, and if that condition is reached, the CPU 1005 may issue an instruction for ending the shooting.

According to the above-described operation method, the shooting operation can be simplified without any particular user's operation for combining images.

Figure 3A:
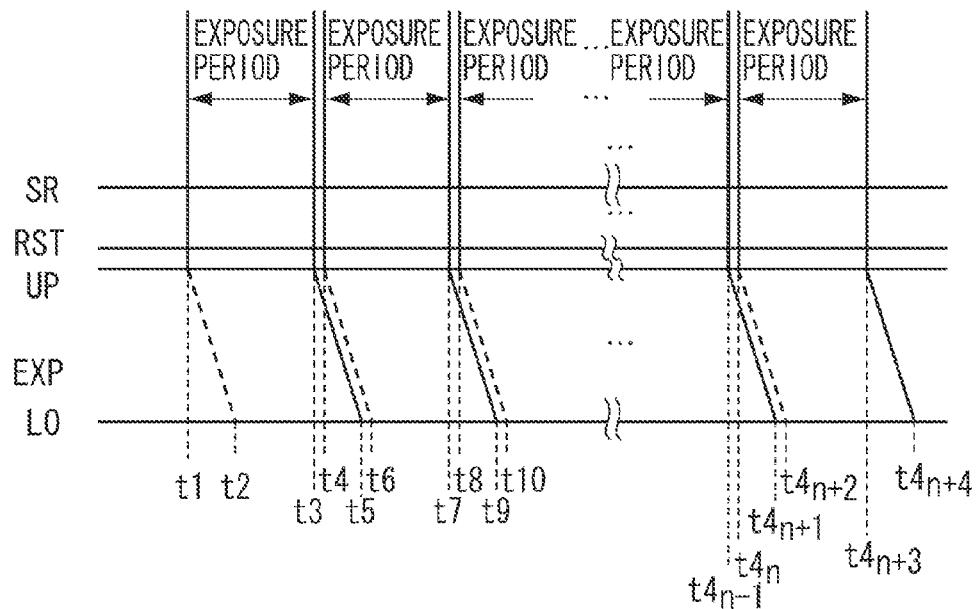
FIGS. 3A and 3B illustrate a driving timing of an image sensor according to the first exemplary embodiment.
Figure 3B:
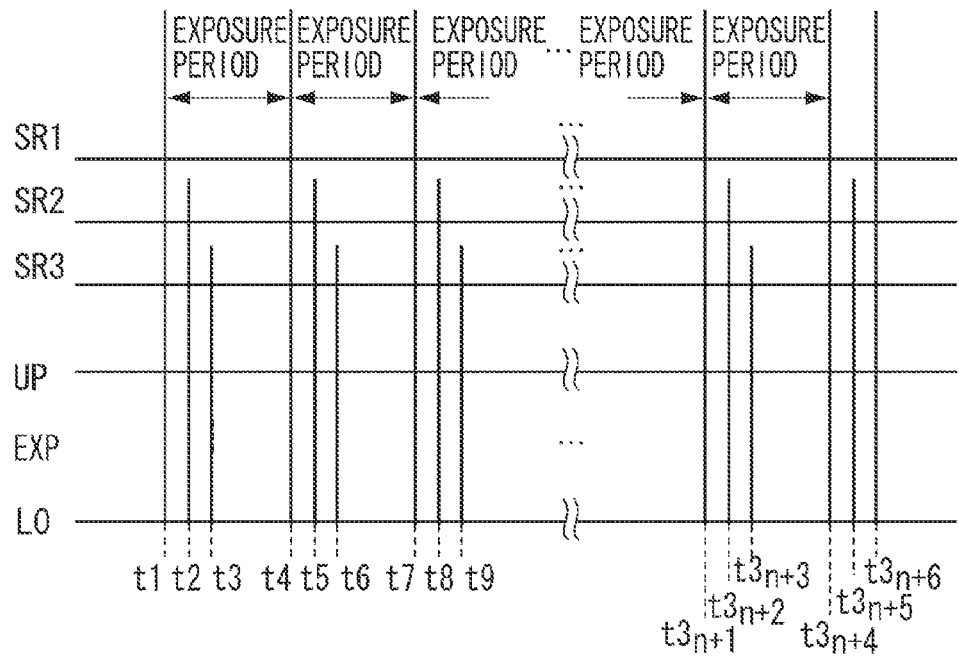

An exposure timing during shooting will be described with reference to FIGS. 3A and 3B. FIGS. 3A and 3B illustrate the exposure timing of the image capture apparatus according to the first exemplary embodiment. FIG. 3A illustrates a case of using a CMOS image sensor as the imaging unit 1003.

Hereinafter, the exposure timing will be described with reference to FIG. 3A. SR indicates a readout signal output by the CPU 1005 to the imaging unit 1003 and RST indicates a reset signal. EXP indicates the exposure timing for an image, while UP indicates the upper portion of an image plane and LO indicates the lower portion of the image plane.

First, at time t+1, the CPU 1005 outputs a reset signal to the imaging unit 1003. Receiving the aforementioned signal, pixels in the imaging unit 1003 undergo discharge of electric charges in order from the upper portion, so that discharge of electric charges of all the pixels is completed by time t2. The discharge of electric charges is called a reset operation of the pixel.

When shooting with the CMOS image sensor through an electronic shutter, theoretically, pixel readout timing and exposure end timing are substantially equal, so that, generally, the contents of the image plane cannot be read out at the same time.

Then, by providing the timing of the reset operation with a time difference equal to the time difference of the readout in the image plane, the exposure time within the image plane is maintained equal.

The aforementioned operation is called rolling shutter, which will not be mentioned further because it has been known to the public.

Time t3 indicates a start timing of the readout from the image plane, and a period from time t1 to time t3 is the exposure period of the upper portion of the image plane. At time t3, a readout pulse is output from the CPU 1005 to the imaging unit 1003, so that signals of pixels are read out successively.

A period taken to read out the whole image plane is time t5−time t3, and the time difference serves as a difference in exposure timing between the upper portion of the image plane and the lower portion of the image plane. Time t4 indicates a reset start position for the second frame of the image plane.

To minimize the non-exposure period, the reset operation for the second frame is started before the readout of the first frame is completed.

Reduction of the non-exposure time enables the trajectory of the bright line changing with time to be captured continuously. Time t6 indicates a timing of the reset completion of the second frame. Times t7, t8, t9, and t10 correspond to times t4, t5, t6, and t7, respectively. The same repetition occurs subsequently.

Assuming that the final number of exposures is n, the timing of the frame is as follows.

At time t4n, the exposure is started from the upper portion of the image plane, and at time t4n+2, the exposure up to the lower portion of the image plane is ended.

At time t4n+3, readout is started from the upper portion of the image plane, and at time t4n+4, readout up to the lower portion of the image plane is ended.

To capture images continuously without any gap in exposure, exposure of a next frame may be started before the readout of a current frame is completed. As described above, the exposure time is desired to be substantially equal to the frame rate.

If the exposure exceeds its appropriate level under an exposure time substantially equal to the aforementioned frame rate, the amount of light is reduced by narrowing the diaphragm or the signal gain is lowered. Consequently, an appropriate signal value can be secured with the exposure time substantially equal to the frame rate.

To acquire a signal value corresponding to an appropriate exposure as described above, the diaphragm or the signal gain may be adjusted.

Any specific method for securing the appropriate exposure will not be described here because it belongs to general knowledge. Unless a sufficient exposure time can be secured at the above frame rate, when the diaphragm or the gain is over their setting ranges, an appropriate frame rate can be secured by retarding the frame rate.

FIG. 3B illustrates a case where a CCD image sensor is used as the imaging unit 1003. Hereinafter, the exposure timing will be described with reference to FIG. 3B.

Here, SR1 indicates a readout signal for the first field output from the CPU 1005 to the imaging unit 1003, SR2 indicates a readout signal for the second field, and SR3 indicates a readout signal for the third field. Other symbols are used in the same way as in FIG. 3A.

Generally, the CCD image sensor carries out not the rolling shutter, which is seen in the CMOS image sensor, but the reset operation for the whole image plane all at once.

According to the readout method which executes no addition of pixels or thinning of pixels with the CCD image sensor, that is, the whole-pixel readout method, generally, the whole image plane is divided into a plurality of fields when reading out the image plane.

The reason for the readout by dividing the whole image plane into a plurality of fields will not be described in detail because this has been generally discussed. Although this example will be described with the whole image plane divided into three fields, actually, any number of the division fields is acceptable.

According to the present exemplary embodiment, assume that, in the first field, the image plane is read out every third line from the first line as a beginning. For the second field, a line just below the line read out in the first field is successively read out. For the third field, the remaining lines are read out.

First, at time t1, the readout signal of the first field is sent from the CPU 1005 to the imaging unit 1003, and after receiving the aforementioned readout signal, the imaging unit 1003 reads out signals corresponding to pixels corresponding to the first field.

Next, at time t2 and time t3, the CPU 1005 sends the readout signals of the second field and the third field to the imaging unit 1003 to read out the signals of the pixels.

Generally, the CCD image sensor executes a one-shot-type exposure of the whole image plane. In this case, unless a mechanical shutter is used when ending the exposure, a difference in exposure time occurs between the fields. However, according to the present exemplary embodiment, an electronic shutter is used to minimize the non-exposure time, so that not simultaneous reset for the whole image plane but a reset operation by the readout of each field is carried out.

The readout period of each field is time t4–time t1 for the first field, time t5–time t2 for the second field, and time t6–time t3 for the third field. The respective field readout periods are substantially equal.

At time t4, time t5, and time t6, output values from the first field, the second field, and the third field of the first frame are read out and the output values are stored in the buffer memory 1004 as the first image.

Next, at time t7, time t8, and time t9, output values from the first field, the second field, and the third field of the second frame are readout and the output values are compared with signal values in the buffer memory 1004 as the second image and then, a calculation result is written into the buffer memory 1004 again.

In exposure for the n-th frame, the exposure start timings of the first field, the second field, and the third field are time t3n+1, time t3n+2, and time t3n+3, which are readout timings for a previous frame.

The exposure end timings of the first field, the second field, and the third field are time t3n+4, time t3n+5, and time t3n+6.

As described above, the CCD image sensor starts exposure of a next frame at the same time when the readout is executed.

To capture images without any exposure interval, the exposure for the next frame may be started before the readout of the previous frame is completed. As described above, the exposure time may be substantially equal to the frame rate.

If the exposure amount exceeds an appropriate level under an exposure time substantially equal to the frame rate, the amount of light is reduced by narrowing the diaphragm or the signal gain is lowered. Consequently, an appropriate exposure amount can be secured with the exposure time substantially equal to the frame rate.

To secure an appropriate exposure amount as described above, the diaphragm or the signal gain may be adjusted. Unless a sufficient exposure time can be secured at the above frame rate, when the diaphragm or the gain is over their setting ranges, the appropriate frame rate can be secured by retarding the frame rate.

An example of images captured by the image capture apparatus according to the first exemplary embodiment will be described with reference to FIGS. 4A, 4B, 4C, and 4D.

Figure 4A:
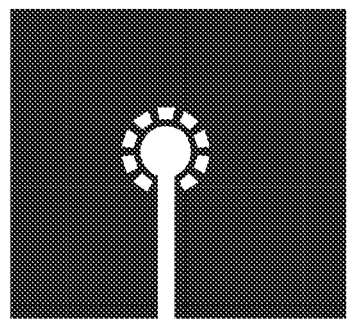
FIGS. 4A, 4B, 4C, and 4D illustrate captured images and a combined image according to the first exemplary embodiment.
Figure 4B:
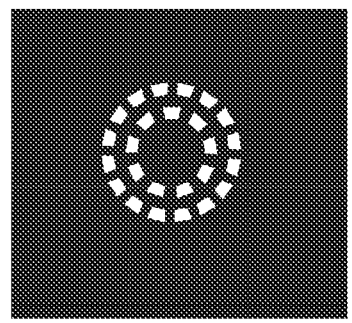
Figure 4C:
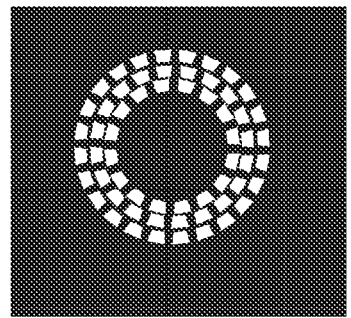

FIG. 4A illustrates an image captured by the first exposure, FIG. 4B illustrates an image captured by the second exposure, and FIG. 4C illustrates an image captured by the third exposure.

If, in the exposure according to the first exemplary embodiment, a pixel address exceeds its threshold in each of three images, its signal value is retained. A pixel address not exceeding the threshold undergoes averaging processing. The above-described processing enables reduction of noise components in a dark portion and, at the same time, suppresses rising of a signal due to retention of the maximum value.

Figure 4D:
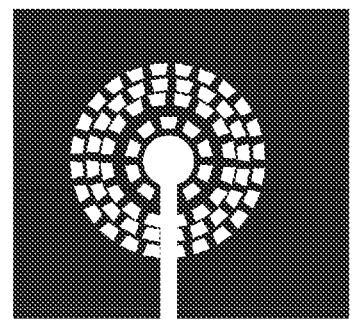

As a result, an image in which portions having a high luminance are overlapped as illustrated in FIG. 4D is obtained, so that the bright lines changing with time can be easily acquired without interruption. According to the present exemplary embodiment, updating of a pixel value using a predetermined threshold is performed every time images are combined just after being captured. Thus, a combined image can be generated with a small capacity memory.

Although, according to the present exemplary embodiment, the combination of images is carried out by updating the pixel values just after the images are captured, the present invention is not restricted to this example, but, after a plurality of images are captured and stored in the memory, the same processing as the present exemplary embodiment of comparison and updating of the pixels may be carried out at the same time when the images are combined.

FIG. 5, which is composed of FIGS. 5A and 5B, is a flow chart illustrating an image capture operation of an image capture apparatus according to a second exemplary embodiment of the present invention. Here, assume that the exposure condition is predetermined by a user or a program for the image capture apparatus, similar to the first exemplary embodiment.

In the present exemplary embodiment, the exposure condition for capturing a plurality of images is not always equal. The reason for this is that the second exemplary embodiment intends to generate a combined image by shooting different objects. The introduction method of the exposure condition for capturing images will not be mentioned here because this is not directly related to the signal processing particular to the present exemplary embodiment, similar to the first exemplary embodiment. As the aforementioned exposure condition, exposure time, aperture value, and ISO sensitivity (corresponds to a signal gain of an image sensor) may be mentioned.

Because, according to the second exemplary embodiment, the mechanical shutter 1002 is used for capturing images, the one-shot-type exposure to the whole image plane is enabled, thereby generating no difference in exposure time in the image plane, unlike the first exemplary embodiment.

For the above reason, the exposure time does not need to be substantially equal to the frame rate, which is a readout time necessary for reading one image, and thus, the restriction on the exposure time, the diaphragm, and the gain due to the frame rate is decreased like the first exemplary embodiment. Thus, a user can easily perform shooting under the desired shooting condition (aperture value, gain, and exposure time).

First, in step S2001, the thresholds KR, KG, and KB are set, similar to the first exemplary embodiment. The setting of the threshold is the same as the first exemplary embodiment.

In step S2002, whether the shutter button is pressed is determined. If the shutter button is pressed (YES in step S2002), then in step S2003, the exposure is started under a condition specified prior to the start of shooting.

After the exposure ends, the mechanical shutter 1002 is closed to protect an imaging surface of the image sensor included in the imaging unit 1003 from light.

In step S2004, after the exposure, a signal for one pixel is readout from the image sensor, and in step S2005, stored in the buffer memory 1004.

In step S2006, the above-described signal readout is repeated until the readout of the signals of all pixels ends. Upon the readout, an appropriate gain is given to a signal. The aforementioned operation is necessary for increasing signals to agree with a preliminarily set ISO sensitivity.

In step S2007, whether the shutter button is pressed second time is determined. If the shutter button is pressed second time (YES in step S2007), then in step S2008, the exposure is started. The second exposure does not need to be executed under the same condition as the first time and rather, and the exposure condition may be set up in accordance with the purpose for shooting.

When the second exposure ends, the mechanical shutter 1002 is closed like the first exposure. In step S2009, a signal for one pixel is read out and an appropriate gain is given to the signal in the same manner as described previously.

Next, in step S2010, both a signal value Si of a pixel read out from the imaging unit 1003 and a signal value Sm of a pixel stored in the buffer memory 1004, corresponding to the signal value Si read out from the imaging unit 1003, are compared with a predetermined threshold. The pixel "corresponding" to the signal value Si refers to a pixel corresponding to an object being shot, and in the present exemplary embodiment in which no positioning processing for images is carried out, the "corresponding" pixels refer to pixels located at the same address. When generating a combined image by combining images after the positioning processing is made by calculating an amount of deviation between the two images based on a difference between the two images, the "corresponding" pixels refer to pixels regarded to be at the same address after the positioning. If both the signal values Si and Sm are smaller than the threshold (YES in step S2010), then in step S2011, the averaging processing of the signal values Si and Sm is carried out and its result is overwritten as a signal value at the same address.

The weighted averaging processing has been already described in the first exemplary embodiment. Unless at least one of the signal values Si and Sm is smaller than the threshold (NO in step S2010), then in step S2012, the buffer memory 1004 is updated with a not smaller one of the signal values Si and Sm.

The purpose for changing the processing in response to the signal value is (1) to keep a signal value of a high luminance portion and (2) to average the signal values of a low luminance portion, to suppress noise.

Discriminating the processing for a dark portion from that for a high luminance portion as described above enables effectively suppressing rising of signals at the black portion due to random noise compared to a case of storing a larger signal value for each of all the pixels.

In step S2013, the above-described processing is repeated until the readout of the signal values for one image plane is completed. Each time the shutter button is pressed in step S2014, the exposure in step S2008, the readout in step S2009, the comparison in step S2010, and updating of the memory in steps S2011 and S2012 are repeated.

When receiving an instruction for ending the shooting or acquiring image data of a predetermined number of images or when a shooting time is finished or an instruction for ending the shooting is issued from the CPU 1005, the shooting ends in step S2015. At this time, image data already generated in the memory is output as final image data and then, the processing for acquiring a combined image ends.

As an instruction for ending the shooting, a shooting end button may be allocated to the operation unit 1010 as a function for user's convenience.

Figure 6A:
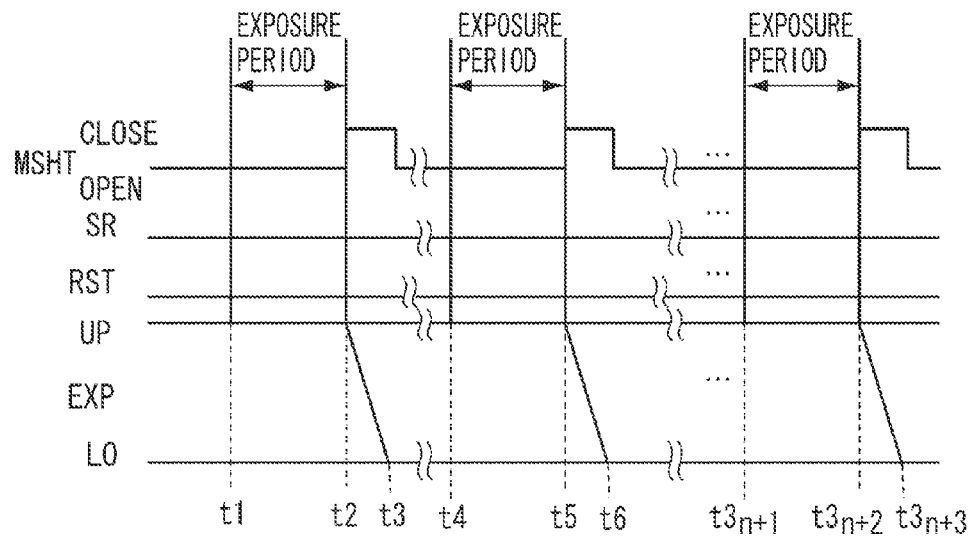
FIGS. 6A and 6B illustrate a driving timing of an image sensor according to the second exemplary embodiment.
Figure 6B:
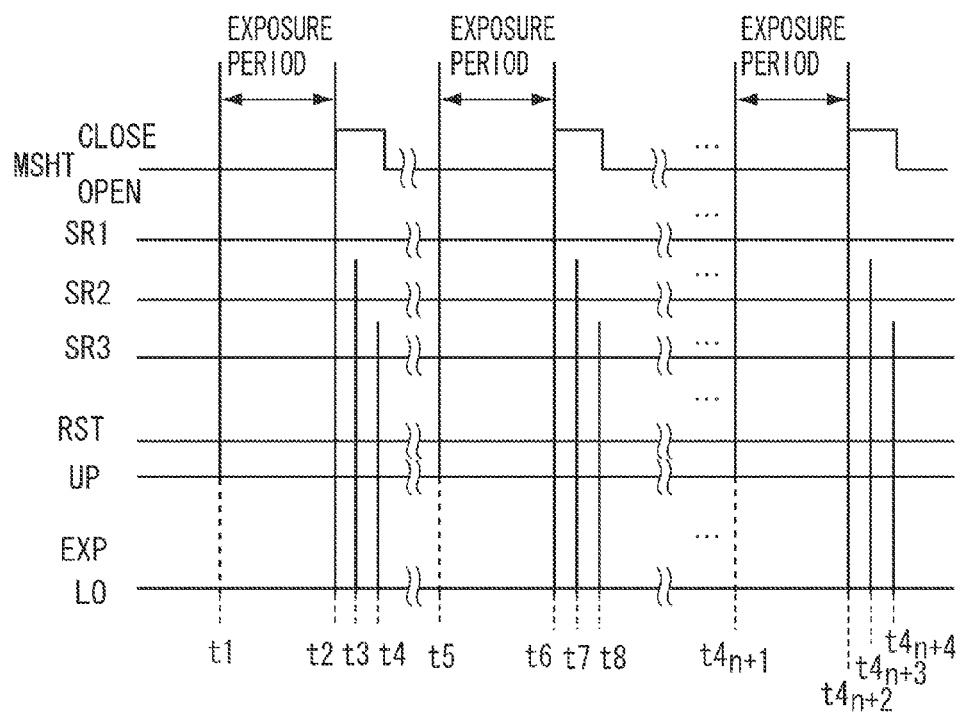

FIGS. 6A and 6B illustrate an exposure timing of the image capture apparatus according to the second exemplary embodiment. FIG. 6A illustrates a case in which the CMOS image sensor is used as the imaging unit 1003. Here, MST indicates a shutter signal output from the CPU 1005 to the mechanical shutter 1002. CLOSE indicates that the mechanical shutter 1002 is closed, and OPEN indicates that it is open. Other symbols are used in the same manner as in FIGS. 3A and 3B.

Hereinafter, the exposure timing will be described with reference to FIG. 6A. First, when a user presses the shutter button, at time t1, a reset signal is output from the CPU to the imaging unit 1003. Receiving the aforementioned signal, electric charges of all pixels in the image sensor included in the imaging unit 1003 are discharged all at once.

Next, at time t2, a CLOSE signal is sent from the CPU 1005 to the mechanical shutter 1002, so that the mechanical shutter 1002 is closed to complete the exposure.

According to the second exemplary embodiment, the mechanical shutter 1002 can be used because of provision of shooting intervals for a plurality of images. Use of the mechanical shutter 1002 enables a deviation in exposure timing between the images to be suppressed, unlike the first exemplary embodiment.

At time t2, at the same time when the mechanical shutter 1002 is closed, the readout of the signal from the imaging unit 1003 is started.

As described in the first exemplary embodiment, the CMOS image sensor reads out signals successively from the upper portion of the image plane to the lower portion of the image plane.

At time t3, the signal readout from the imaging unit 1003 is completed, and a next operation is user's pressing the shutter button provided on the operation unit 1010.

When the user presses the shutter button again after some time, at time t4, the CPU 1005 sends the reset signal to the imaging unit 1003 to start the second exposure.

In the exposure and readout operations, times t4, t5, and t6 correspond to times t1, t2, and t3, respectively. The same operation is repeated subsequently.

Assuming that the number of exposures to be performed up to the final exposure is n, times t3n+1, t3n+2, and t3n+3 when the n-th image is captured correspond to times t1, t2, and t3, respectively.

FIG. 6B illustrates a case where the CCD image sensor is used as the image sensor included in the imaging unit 1003. The symbols in FIG. 6B are used in the same way as FIGS. 3A, 3B and FIG. 4A.

Hereinafter, the exposure timing will be described with reference to FIG. 6B. According to the present exemplary embodiment also, assume that, in the first field, the whole image plane is read out every third line from the first line as a beginning, and in the second field, a line just below the line read out in the first field is read out successively, and then, in the third field, the remaining lines are read out.

First, when the user presses the shutter button, at time t1, the CPU 1005 sends the reset signal to the imaging unit 1003. Receiving the aforementioned signal, electric charges of all pixels in the image sensor included in the imaging unit 1003 are discharged all at once.

Next, at time t2, the CPU 1005 sends a signal to the mechanical shutter 1002, so that the mechanical shutter 1002 is closed to complete the exposure.

At time t2, at the same time when the mechanical shutter 1002 is closed, the readout of signals in the first field from the imaging unit 1003 is started.

After the readout of signals in the first field is completed, at time t3, the readout of signals in the second field from the imaging unit 1003 is started.

After the readout of signals in the second field is completed, at time t4, the readout of signals in the third field from the imaging unit 1003 is started.

After the readout of all the fields is completed, a next step is user's pressing the shutter button provided on the operation unit 1010.

Next, when the user presses the shutter button, at time t5, the CPU 1005 sends the reset signal to the imaging unit 1003. Receiving the aforementioned signal, electric charges of all pixels in the image sensor included in the imaging unit 1003 are discharged all at once. According to a subsequent timing chart, the same exposure as the first time is repeated, and times t5, t6, t7, and t8 correspond to times t1, t2, t3, and t4, respectively. The same operation is repeated subsequently.

Assuming that the number of exposures to be performed up to the final exposure is n, times t4n+1, t4n+2, t4n+3, and t4n+4 when the n-th image is captured correspond to times t1, t2, t3, and t4, respectively.

As described above, the second exemplary embodiment provides no restriction on the exposure time because the frame rate does not vary depending on which is used the CMOS image sensor or the CCD image sensor. Thus, a user can set the exposure time at his or her disposal. The user can capture images at his or her desired timing by securing a shooting interval.

Securing the shooting interval enables the user to set a shooting condition (gain, aperture value, and exposure time) for each of a plurality of images to be captured at his or her disposal.

The above-described setting enables the user to expand user's possibility of generating a combined image with a simple operation.

FIGS. 7A, 7B, 7C, 7D, 7E, and 7F illustrate results of shooting by the image capture apparatus according to the second exemplary embodiment. An example of captured images of fireworks will be described here.

Figure 7A:
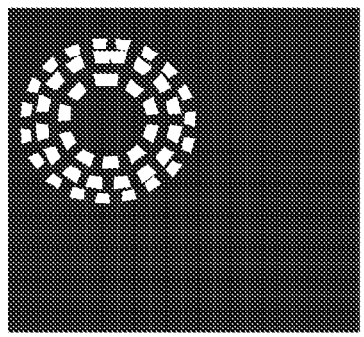
FIGS. 7A, 7B, 7C, 7D, 7E, and 7F illustrate captured images and a combined image according to the second exemplary embodiment.
Figure 7B:
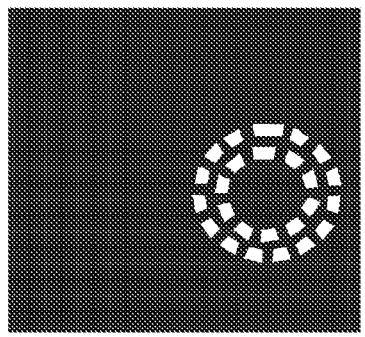
Figure 7C:
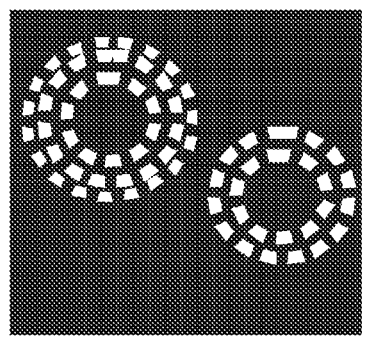

FIG. 7A illustrates an image captured with the first exposure, FIG. 7B illustrates an image captured with the second exposure, and FIG. 7C illustrates an image obtained with a combination of the images.

The exposure according to the second exemplary embodiment enables the user to perform shooting with a higher freedom because the user can arbitrarily specify the exposure condition for each image.

Two images are utilized while one comes from the imaging unit 1003 and the other comes from the buffer memory 1004. If, at some pixel address, any one of the signal values from the imaging unit 1003 and the buffer memory 1004 exceeds a threshold, a higher one of the signal values is used to update the buffer memory 1004. A pixel address which does not exceed the threshold undergoes averaging processing. As a result of the above-described processing, like the first exemplary embodiment, noise components at the dark portion are reduced, and at the same time, rising of a signal due to retention of the maximum value can be suppressed.

As a result, a combined image is generated by overlapping high luminance portions as illustrated in FIG. 7C, so that the user can easily acquire a combined image generated by combining a plurality of firework images without a loss of highlight detail or underexposure. Further, in the present exemplary embodiment, no difference in exposure time within the image plane is generated when the CMOS image sensor or the CCD image sensor reads out images, unlike the first exemplary embodiment, and consequently, a higher quality image can be obtained.

Figure 7D:
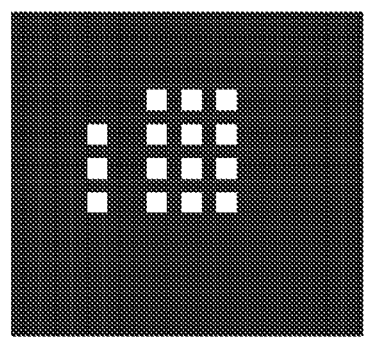
Figure 7E:
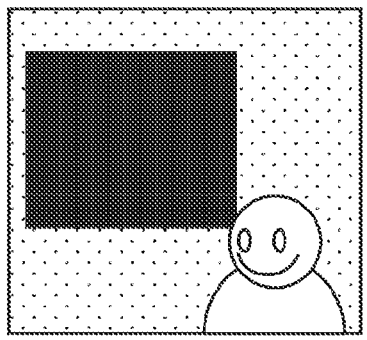
Figure 7F:
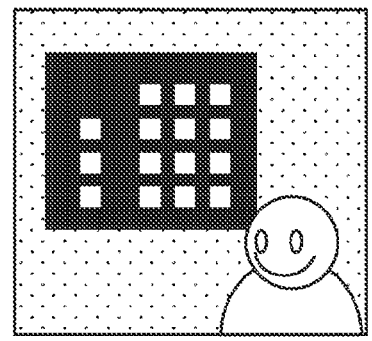

FIG. 7D illustrates an image captured with the first exposure, FIG. 7E illustrates an image captured with the second exposure, and FIG. 7F illustrates an image obtained with a combination of the images.

This example illustrates an example of generating a combined image (FIG. 7F) which expresses both indoor scene and outdoor scene generated using a captured night view image (FIG. 7D) seen through a window of a not-illuminated room and an indoor illuminated room view image (FIG. 7E).

The images illustrated in FIGS. 7D and 7E are results captured by shooting each object under an appropriate exposure condition.

Generally, to obtain such a combined image, addition processing on the images illustrated in FIGS. 7D and 7E is executed, or the image illustrated in FIG. 7D is embedded into the window frame of the image illustrated in FIG. 7E.

Further, because such processing is often executed using a personal computer for the reason of its processing characteristic, it is difficult to generate any combined image immediately after capturing necessary images.

However, according to the present exemplary embodiment, a user can obtain the combined image in a short time without any worrisome burden by shooting twice and executing simple signal processing.

Thus, a combined image generated based on a plurality of images captured by the continuous shooting can be obtained with a small capacity memory by a simple operation.

Figure 8B:
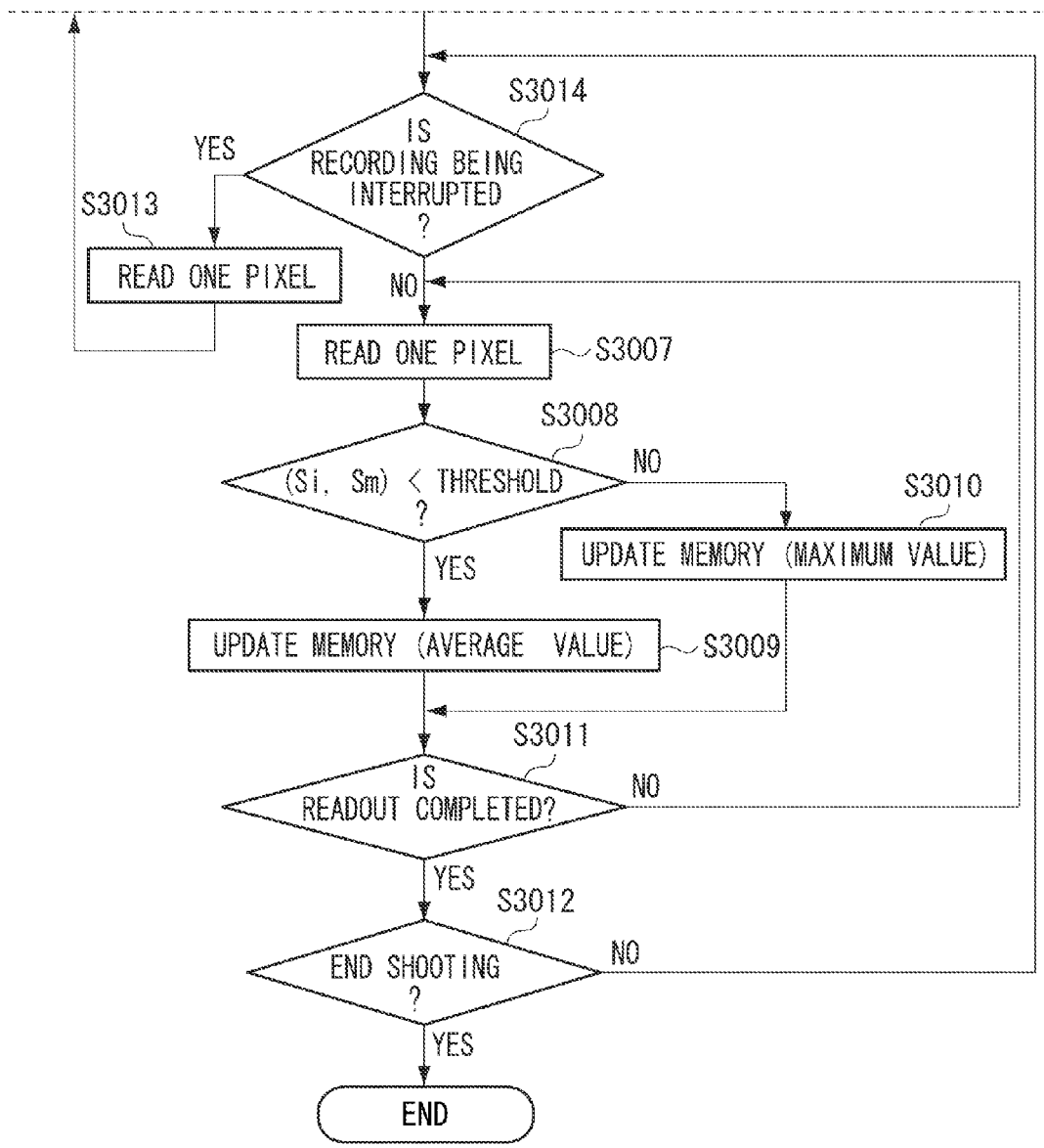
FIG. 8, which is composed of FIGS. 8A and 8B, is a flow chart illustrating a driving method for an image capture apparatus according to a third exemplary embodiment of the present invention.

A driving method for an image capture apparatus according to a third exemplary embodiment of the present invention will be described with reference to FIG. 8. FIG. 8, which is composed of FIGS. 8A and 8B, is a flow chart illustrating a shooting operation of the image capture apparatus according to the present exemplary embodiment. Here, assume that the exposure condition is predetermined by a user or a program stored in the image capture apparatus.

Additionally, assume that the exposure condition for capturing each of a plurality of images is identical, similar to the first exemplary embodiment. The reason for this is due to an assumption that, like the first exemplary embodiment, a plurality of exposures are executed on an identical object whose shape changes with time.

Further, like the first exemplary embodiment, the introduction method for the exposure condition is not described here because it is not directly related to signal processing particular to the present exemplary embodiment. As the aforementioned exposure condition, exposure time, aperture value, and ISO sensitivity (corresponding to a signal gain of an output from the imaging unit) may be mentioned.

According to the third exemplary embodiment also, the exposure time is substantially the same as the readout time for one image, namely, the frame rate, like the first exemplary embodiment. The purpose for this is to capture the trajectory of a moving bright line without interruption by making a non-exposure time as short as possible.

If the exposure amount is over an appropriate level, the diaphragm may be narrowed to reduce the amount of incident light on the image sensor, or the frame rate is adjusted substantially equal to the exposure time by decreasing the signal gain.

When the signal gain is increased, the SN ratio deteriorates. Thus, if the light amount is short even when the diaphragm is opened fully or the diaphragm needs to be kept narrow in order to secure a large depth of field, the gain may be increased.

The third exemplary embodiment has a shooting interruption function added to the first exemplary embodiment and its flow chart is the same except a part.

First, in step S3001, thresholds KR, KG, and KB are set. Steps up to step S3006 are similar to steps S1001 to S1006 in the first exemplary embodiment.

After the second exposure is completed in step S3006, then in step S3014, whether recording is being interrupted is determined. The operation unit 1010 may be provided with a recording interruption button, and when a user presses the recording interruption button, it is determined that the recording is being interrupted.

If it is determined that the recording is being interrupted (YES in step S3014), then in step S3013, signals for one image plane are read out from the imaging unit 1003 to start a next exposure in step S3006. Thus, the content of the buffer memory 1004 is not updated here. The signal readout from the imaging unit 1003 without updating of the buffer memory 1004 is called blank readout.

Next, unless it is determined that the recording is being interrupted (NO in step S3014), then in step S3007, a signal for one pixel is read out, followed by comparison with signal values recorded in the buffer memory 1004 and updating of the signal values in the memory. The above-mentioned operations are executed for one image plane. Steps S3007 to S3012 in the third exemplary embodiment are similar to steps S1007 to S1012 in the first exemplary embodiment.

As described above, each time a plurality of images are read out, whether recording is being interrupted is determined. Unless recording is being interrupted, the content of the buffer memory 1004 is updated similar to the first exemplary embodiment.

The exposure timing for shooting in the third exemplary embodiment will not be described because it is similar to the first exemplary embodiment.

FIGS. 9A, 9B, 9C, 9D, 9F, and 9G illustrate results of shooting with the image capture apparatus according to the third exemplary embodiment. This example illustrates a case of capturing images of fireworks.

Figure 9A:
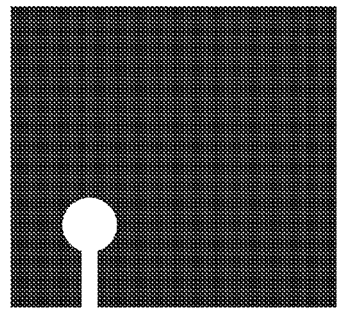
FIGS. 9A, 9B, 9C, 9D, 9E, 9F, and 9G illustrate captured images and a combined image according to the third exemplary embodiment.
Figure 9B:
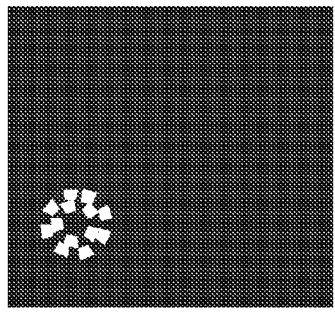
Figure 9C:
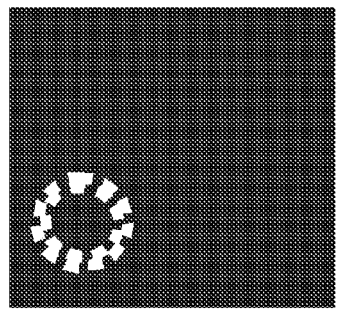

FIG. 9A illustrates an image captured with the first exposure, and FIGS. 9B to 9F illustrate images captured with the second exposure and subsequent ones. FIGS. 9A, 9B, 9C illustrate three images captured by continuous exposures.

Figure 9D:
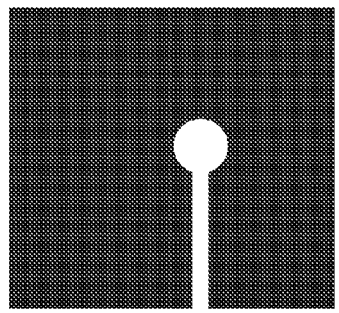
Figure 9E:
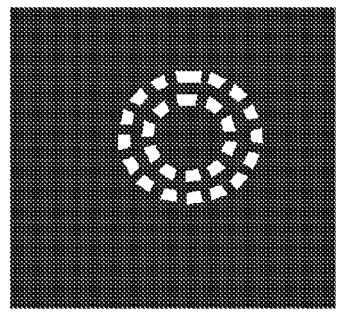
Figure 9F:
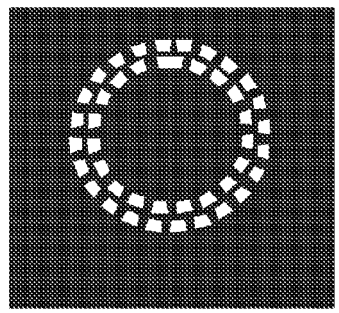

FIGS. 9D, 9E, and 9F illustrate three images captured under continuous exposures performed after an interruption after capturing the image illustrated in FIG. 9C.

In the third exemplary embodiment, blank readout, in which no signal value in the buffer memory 1004 is updated, is carried out in a period between images illustrated in FIG. 9C and FIG. 9D.

Figure 9G:
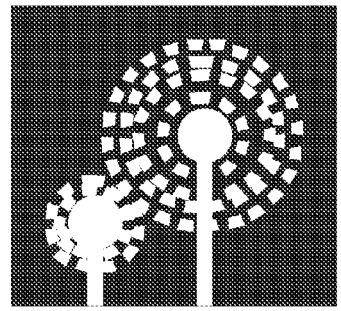

User's operations are as follows. If the user determines that no exposure is necessary after exposing for the images illustrated in FIGS. 9A, 9B, and 9C, the user can stop updating the signal values in the buffer memory 1004 by pressing the exposure interruption button. Any images captured in this period is not reflected on the combined image. Next, when the user restarts the shooting by pressing an exposure restart button, images illustrated in FIGS. 9D, 9E, and 9F are acquired continuously. When the user ends the shooting, an image illustrated in FIG. 9G is generated by combining the images illustrated in FIGS. 9A to 9F.

According to the third exemplary embodiment, addition of the exposure interruption function to the first exemplary embodiment enables the user to acquire images for use for combining images at a user's desired timing to generate an image intended by the user.

Although the present exemplary embodiment mentions nothing about signals read out at the time of the blank readout, the read out signal may be sent directly to the CPU 1005 to display a through-the-lens image.

Although, according to the present exemplary embodiment, the imaging unit 1003 is driven even during an exposure interruption, the imaging unit 1003 may be stopped during the exposure interruption for power saving.

In the above-described way, a combined image generated based on a plurality of images captured by continuous shooting can be obtained with a small capacity memory by a simple operation.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-006124 filed Jan. 14, 2011, which is hereby incorporated by reference herein in its entirety.

What is claimed is:

1. An image capture apparatus comprising:
an imaging unit configured to capture an image of an object to output image data;
a memory;
a comparison unit configured to compare both a first value of a pixel of first image data output from the imaging unit and a second value of a pixel, corresponding to the first value of the first image data, of second image data stored in the memory with a predetermined threshold;
an updating unit configured to, when at least one of the first value and the second value exceeds the predetermined threshold in comparison by the comparison unit, update the second value with a value that is equal to or greater than the first value and the second value; and
a control unit configured to generate, using image data stored in the memory after causing the comparison unit and the updating unit to repeat the comparison and the updating of image data for a plurality of image planes, combined image data from the image data for a plurality of image planes.

2. The image capture apparatus according to claim 1, wherein, if neither the first value nor the second pixel exceeds the predetermined threshold in comparison by the comparison unit, the updating unit is configured to update the second value with an average value of the first value and the second value.

3. The image capture apparatus according to claim 2, wherein the average value used by the updating unit is a value obtained by weighted-averaging so that a weight of each image plane is equal.

4. The image capture apparatus according to claim 1, wherein the predetermined threshold is set for each color filter of an image sensor.

5. The image capture apparatus according to claim 4, further comprising a white balance processing unit configured to perform white balance processing on image data output from the imaging unit,
wherein the predetermined threshold for each color filter is determined based on a white balance coefficient used for the white balance processing.

6. The image capture apparatus according to claim 5, wherein the white balance coefficient is determined using a result of a preliminary shooting prior to a shooting with the imaging unit.

7. The image capture apparatus according to claim 3, wherein, when an average of a luminance value of image data for one image plane stored in the memory to be updated by the updating unit exceeds a predetermined luminance value, the control unit is configured to end generation of the combined image data.

8. The image capture apparatus according to claim 3 further comprising a specifying unit configured to specify a number of images to be captured by the imaging unit with a user's operation,
wherein the control unit is configured to generate the combined image data using image data for the number of images specified by the specifying unit.

9. The image capture apparatus according to claim 1 further comprising an instruction unit configured to issue an instruction to end shooting by the imaging unit with a user's operation.

10. The image capture apparatus according to claim 1, wherein the imaging unit is configured to use an electronic shutter for an exposure for acquiring the image data for a plurality of image planes.

11. The image capture apparatus according to claim 1, wherein the imaging unit includes a complementary metal-oxide semiconductor (CMOS) image sensor, and
wherein the imaging unit uses a rolling shutter for an exposure for acquiring the image data of a plurality of image planes, and, during a signal readout of a current frame, starts a reset operation for a next frame.

12. The image capture apparatus according to claim 1, wherein the imaging unit is configured to capture an image under an identical exposure condition to acquire the image data of a plurality of image planes.

13. The image capture apparatus according to claim 1, wherein an exposure condition for the imaging unit to acquire the image data of a plurality of image planes is specified by a user prior to shooting for capturing a first image.

14. The image capture apparatus according to claim 1, wherein the imaging unit is configured to determine an exposure condition for acquiring the image data of a plurality of image planes based on a result of executing a preliminary shooting prior to a shooting for capturing a first image, and to capture the image data under the determined exposure condition.

15. The image capture apparatus according to claim 1, wherein, when acquiring the image data of a plurality of image planes, the imaging unit is configured to use a mechanical shutter as a shutter for ending an exposure.

16. An image capture apparatus comprising:
an imaging unit configured to capture an image of an object to output image data; and
a combination unit configured to combine a plurality of image data obtained from the imaging unit to generate a combined image data,
wherein, if at least one of values of mutually-corresponding pixels between the plurality of image data at an address is larger than a predetermined threshold, the combination unit is configured to set a maximum value of the values as a value at the address, and
if all the values of the mutually-corresponding pixels between the plurality of image data at the address are smaller than the predetermined threshold, the combination unit is configured to set an average of the values as the value at the address, to generate the combined image data for one image plane.

17. A method for controlling an image capture apparatus including an imaging unit configured to capture an image of an object to output image data, and a memory, the method comprising:
   comparing both a first pixel value of first image data output from the imaging unit and a second value, corresponding to the first value of the first image data, of second image data stored in the memory with a predetermined threshold;
   updating, when at least one of the first value and the second value exceeds the predetermined threshold in the comparison, the second value with a greater pixel value than the first value and the second value; and
   generating, using image data stored in the memory after repeating the comparison and the updating of the image data for a plurality of image planes, combined image data from the image data for a plurality of image planes.

18. A method for controlling an image capture apparatus including an imaging unit configured to capture an image of an object to output image data, and a combination unit configured to combine a plurality of image data obtained from the imaging unit to generate a combined image data, the method comprising:
   comparing each of values of mutually-corresponding pixels between the plurality of image data at an address with a predetermined threshold;
   setting, if at least one of the values is larger than the predetermined threshold in the comparison, a maximum value of the values as a value at the address; and
   setting, if all the values are smaller than the predetermined threshold in the comparison, an average of the values as the value at the address, to generate the combined image data for one image plane.

19. A non-transitory computer-readable storage medium storing a program for causing the image capture apparatus to execute the method according to claim 17.

20. A non-transitory computer-readable storage medium storing a program for causing the image capture apparatus to execute the method according to claim 18.

\* \* \* \* \*